(12) United States Patent
Clinger

(10) Patent No.: US 10,591,336 B2
(45) Date of Patent: Mar. 17, 2020

(54) METHOD FOR MAXIMIZING FLOWMETER TURNDOWN AND RELATED APPARATUS

(71) Applicant: Micro Motion, Inc., Boulder, CO (US)

(72) Inventor: Asher James Clinger, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/080,883

(22) PCT Filed: Mar. 25, 2016

(86) PCT No.: PCT/US2016/024269
§ 371 (c)(1),
(2) Date: Aug. 29, 2018

(87) PCT Pub. No.: WO2017/164891
PCT Pub. Date: Sep. 28, 2017

(65) Prior Publication Data
US 2019/0011301 A1    Jan. 10, 2019

(51) Int. Cl.
*G01F 1/84*  (2006.01)
*G01F 15/00*  (2006.01)
*G01F 7/00*  (2006.01)

(52) U.S. Cl.
CPC .......... *G01F 1/8477* (2013.01); *G01F 1/8486* (2013.01); *G01F 1/8495* (2013.01); *G01F 7/00* (2013.01); *G01F 15/005* (2013.01)

(58) Field of Classification Search
CPC .................................... G01F 1/84; G01F 1/66
See application file for complete search history.

(56) References Cited

U.S. PATENT DOCUMENTS

| 8,826,731 | B2 * | 9/2014 | Speldrich | F17D 1/00 |
| | | | | 73/204.21 |
| 2008/0016957 | A1 * | 1/2008 | Suzuki | G01F 1/6842 |
| | | | | 73/204.21 |
| 2008/0087099 | A1 * | 4/2008 | Allenberg | G01F 1/662 |
| | | | | 73/861.08 |
| 2010/0050783 | A1 * | 3/2010 | Hussain | G01F 1/8495 |
| | | | | 73/861.357 |

FOREIGN PATENT DOCUMENTS

| CN | 101979965 B | 9/2013 |
| JP | 2006337383 A | 12/2006 |

* cited by examiner

*Primary Examiner* — Jewel V Dowtin
(74) *Attorney, Agent, or Firm* — The Ollila Law Group LLC

(57) ABSTRACT

A flowmeter (5) having a sensor assembly (10) connected to meter electronics (20) is provided. The sensor assembly (10) comprises at least one driver (104), at least one pickoff (105), and a conduit array (300). The conduit array (300) comprises a plurality of small conduits (302) therein that are configured to receive a process fluid, and further configured to selectably adjust the beta ratio of the flowmeter (5).

14 Claims, 7 Drawing Sheets

METHOD FOR MAXIMIZING FLOWMETER TURNDOWN AND RELATED APPARATUS

TECHNICAL FIELD

The present invention relates to flowmeters, and more particularly to a flowmeter configured to maximize turndown and related methods.

BACKGROUND OF THE INVENTION

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or with a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

In prior art flowmeters, since the Coriolis force changes with the velocity squared, as the Coriolis force becomes smaller it is more difficult to obtain accurate measurements, which lead to errors. Another result is a flowmeter having a relatively small turndown rate.

Therefore, there is a need in the art for a method and related apparatus to maximize the turndown of a flowmeter.

The present embodiments overcome these and other problems by providing a method and related apparatus to maximize the turndown of a flowmeter. In particular, a flowmeter and related method are provided that optimize a flow path based upon the process fluid flow experienced by the flowmeter. As flow decreases, flow tube arrangement changes to optimally increase Coriolis force, thus enabling a higher turndown and achieving an advance in the art.

SUMMARY OF THE INVENTION

A flowmeter having a sensor assembly connected to meter electronics is provided according to an embodiment. The sensor assembly comprises at least one driver and at least one pickoff, and further comprises a conduit array comprising a plurality of small conduits therein being configured to receive a process fluid therein, and further configured to selectably adjust the beta ratio of the flowmeter.

A method of forming a flowmeter is provided according to an embodiment. A sensor assembly comprising conduits and at least one driver and at least one pickoff attached to the conduits is provided. The conduits comprise a conduit array further comprising a plurality of small conduits therein, being configured to receive a process fluid therein, and configured to selectably adjust the beta ratio of the flowmeter.

Aspects

According to an aspect, a flowmeter having a sensor assembly connected to meter electronics, wherein the sensor assembly comprises at least one driver and at least one pickoff, comprises a conduit array comprising a plurality of small conduits therein, configured to receive a process fluid therein, and further configured to selectably adjust the beta ratio of the flowmeter.

Preferably, the conduit array comprises between 3 and 30 small conduits.

Preferably, the conduit array comprises between 30 and 300 small conduits.

Preferably, the conduit array comprises between 30 and 3000 small conduits.

Preferably, the conduit array is configured to adjust a total area of the small conduits available for process fluid flow.

Preferably, each one of the plurality of small conduits is selectable to provide flow therethrough.

Preferably, a valve is configured to provide fluid communication to a subset of the plurality of small conduits in order to receive the process fluid therein.

According to an aspect, a method of forming a flowmeter comprises the step of providing a sensor assembly comprising conduits and at least one driver and at least one pickoff attached to the conduits, wherein the conduits comprise a conduit array comprising a plurality of small conduits therein, being configured to receive a process fluid therein, and configured to selectably adjust the beta ratio of the flowmeter.

Preferably, the conduit array comprises between 3 and 30 small conduits.

Preferably, the conduit array comprises between 30 and 300 small conduits.

Preferably, the conduit array comprises between 30 and 3000 small conduits.

Preferably, the method comprises the step of adjusting a total area of the small conduits available for process fluid flow.

Preferably, each one of the plurality of small conduits is selectable to provide flow therethrough.

Preferably, the method comprises the step of providing a valve configured to provide fluid communication to a subset of the plurality of small conduits in order to receive the process fluid therein.

DETAILED DESCRIPTION OF THE INVENTION

FIGS. 1-10 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
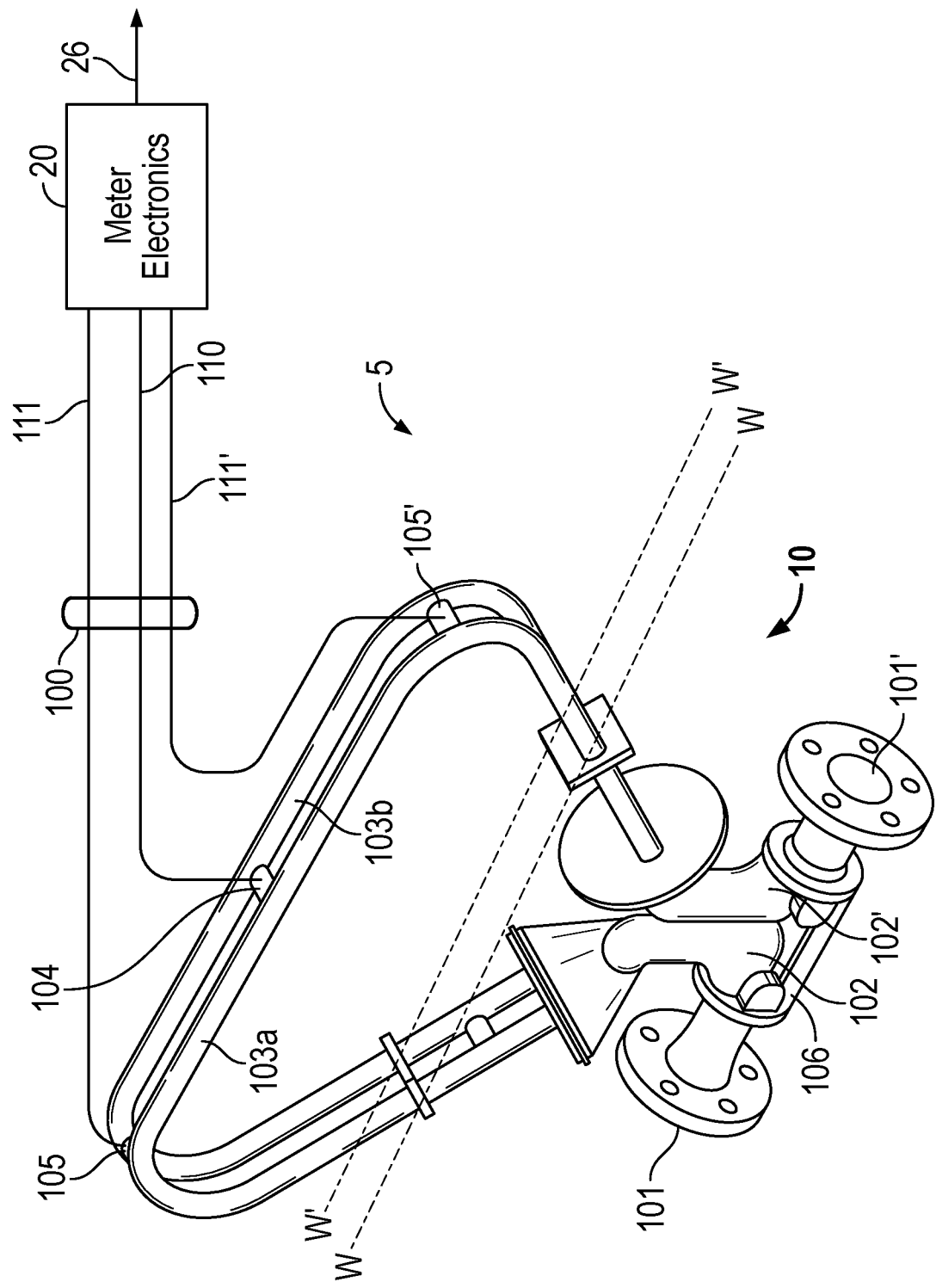
FIG. 1 shows a flowmeter sensor assembly according to an embodiment.

FIG. 1 illustrates an example of a flowmeter 5 sensor assembly 10 in the form of a Coriolis flowmeter comprising one or more meter electronics 20. The one or more meter electronics 20 are connected to sensor assembly 10 to measure a characteristic of a flowing material, such as, for example, density, pressure, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. The manifolds 102, 102' are typically multi-piece assemblies. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds 102 and 102' in a parallel fashion. When the sensor assembly 10 is inserted into a pipeline system which carries the process material, the material enters sensor assembly 10 via an inlet pipe 120 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode may be the first out of phase bending mode and the conduits 103A and 103B would be selected and appropriately mounted to inlet manifold 102 and outlet manifold 102', so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via lead 110, and passed through the coil to cause both conduits 103A, 103B to oscillate.

The sensor assembly 10 shown includes a pair of pickoffs 105, 105' that are affixed to conduits 103A, 103B. More particularly, a first pickoff component (not shown) is located on conduit 103A and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

In the example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, pressure, and other information. More particularly, the one or more meter electronics 20 receive one or more signals, for example, from pickoffs 105, 105' and one or more temperature sensors 107, such as a resistive temperature detector (RTD), and use this information to measure a characteristic of a flowing material.

Figure 2:
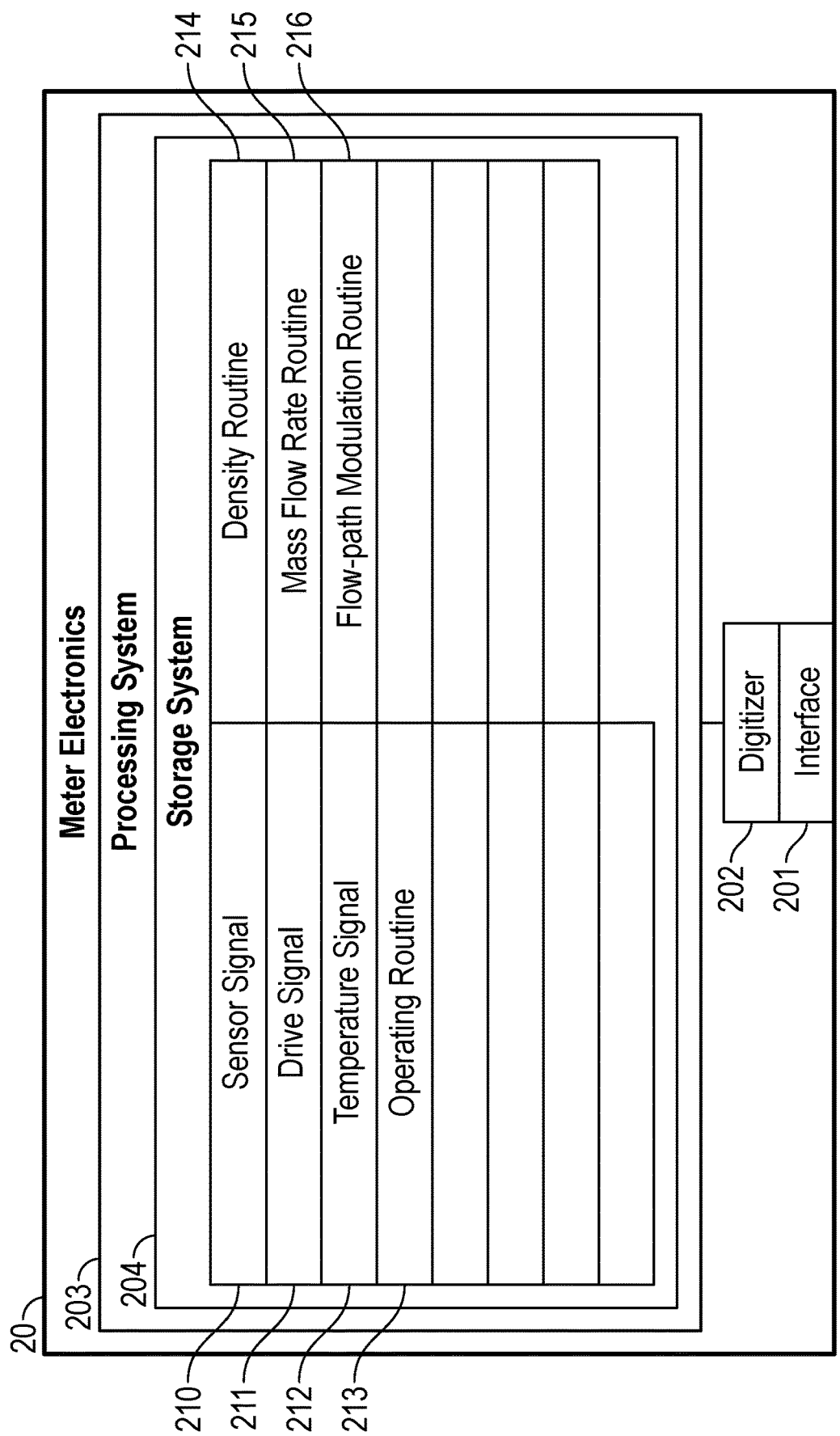
FIG. 2 shows meter electronics according to an embodiment.

FIG. 2 illustrates the meter electronics 20 according to an embodiment. The meter electronics 20 can include an interface 201 and a processing system 203. The processing system 203 may include a storage system 204. The storage system 204 may comprise an internal memory, and/or may comprise an external memory. The meter electronics 20 can generate a drive signal 211 and supply the drive signal to the driver 104 via pathway 110. In addition, the meter electronics 20 can receive sensor signals 210 from the sensor assembly 10 such as pickoff/velocity sensor signals, strain signals, optical signals, temperature signals, or any other signals known in the art. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present embodiments. The meter electronics 20 can process the sensor signals 210 in order to obtain flow characteristics of the material flowing through the flow conduit 103. In some embodiments, the meter electronics 20 may receive a temperature signal 212 from one or more RTD sensors or other temperature sensors 107, for example.

The interface 201 can receive the sensor signals from the driver 104 or pickoffs 105, 105', via pathways 110, 111, 111', respectively. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment can include a digitizer 202, wherein the sensor signal comprises an analog sensor signal. The digitizer 202 can sample and digitize the analog sensor signal and produce a digital sensor signal. The digitizer 202 can also perform any needed decimation, wherein the digital sensor signal is decimated in order to reduce the amount of signal processing needed and to reduce the processing time.

The processing system 203 can conduct operations of the meter electronics 20 and process flow measurements from the sensor assembly 10. The processing system 203 can execute one or more processing routines, such as the operating routine 213, density routine 214, mass flow rate routine 215, and a flow-path modulation routine 216, for example without limitation, and thereby process the flow measurements in order to produce one or more flow measurements that are ultimately used to operate the flowmeter 5, perform desired functions, and any other related calculations.

The processing system 203 can comprise a general purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

The processing system 203 processes the sensor signal 210 in order to generate the drive signal 211, among other things. The drive signal 211 is supplied to the driver 104 in order to vibrate the associated conduit(s), such as the conduit 103 of FIG. 1 for example.

It should be understood that the meter electronics 20 may include various other components and functions that are generally known in the art. These additional features are omitted from the description and the figures for the purpose of brevity. Therefore, the present invention should not be limited to the specific embodiments shown and discussed.

According to an embodiment, the meter electronics 20 can be configured to measure flow through the flowmeter 5 as part of a mass flow rate routine 215. According to an embodiment, the meter electronics 20 can also measure a temperature signal 212, and adjust the calculated flow rates based on the measured temperature.

Coriolis force may be calculated by the following example equation:

$$F_c = 2m\omega \times \vec{V} \quad (1)$$

This equation states that a mass (m) moving at a velocity ($\vec{V}$) in a system vibrating at a frequency ($\omega$) will create a Coriolis force ($F_C$). This equation uses a constant mass for the calculation. In the flowmeter 5, the mass flowing therethrough is typically a steady stream of a process fluid. To consider this stream of fluid as a single lump mass at a given time, for calculation purposes, the following equation may be used:

$$m = \rho \vec{V} A dt \quad (2)$$

Where $\rho$ is the density of the process fluid, and A is the area of the flow conduit, and dt is a time difference. It should be noted that the time difference may, in some embodiments, be a predetermined amount of time. Combining the previous two equations the following equation is formed:

$$F_c = 2\omega\rho \vec{V} A dt \times \vec{V} \quad (3)$$

Assuming that the fluid flow is perpendicular to the vibration, the equation can be simplified to:

$$F_c = 2\omega\rho A V^2 dt \quad (4)$$

It will be clear to one skilled in the art that, for a flowmeter 5, the only parameter that can be changed by meter design according to above-noted equations, is the cross section area (A) of a flow conduit 103. As an example of a flow-path modulation routine 216, the number and/or area of conduits 103 or structures within or without the conduit 103 are modulated to adjust the fluid flow within the sensor assembly 10, as will be more fully described below. In short, meter electronics 20 may, in an embodiment, aid in mediating modulation of the flow area of the sensor assembly 10. This may be accomplished by only allowing a certain number of flow conduits to be active at a particular time, as will be described more fully below. This allows measurement of low fluid flows accurately, yet handles high flow rates without heavy pressure loss, thus maximizing turndown. In conjunction with modulating the flow path area/number of active conduits, the flow area determination routine 218 stores a determined area of the active conduits 103, which may be utilized to calculate mass flow, density flow, and other flowmeter 5 values.

In prior art flow meters, Coriolis forces change with the process fluid velocity, squared. As the Coriolis force becomes smaller, it is more difficult to accurately determine the flow rate, which ultimately dictates the maximum turndown rate of a particular flowmeter.

Figure 3:
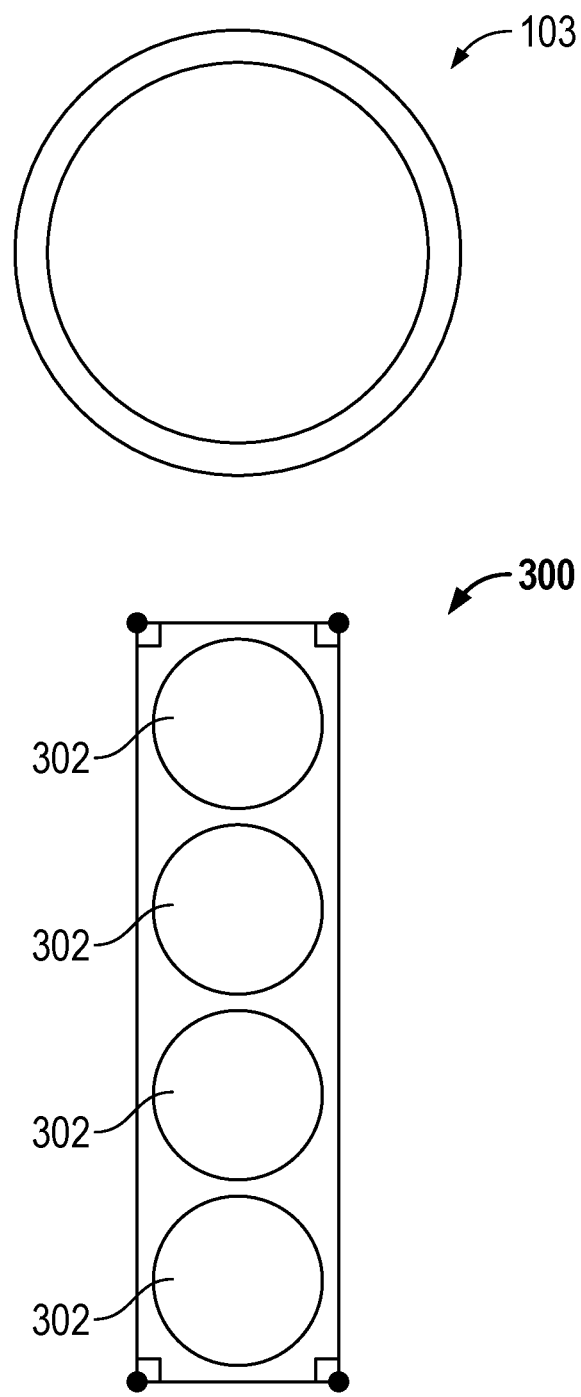
FIG. 3 illustrates a cross-sectional comparison of a prior art conduit and a conduit array according to an embodiment.
Figure 4:
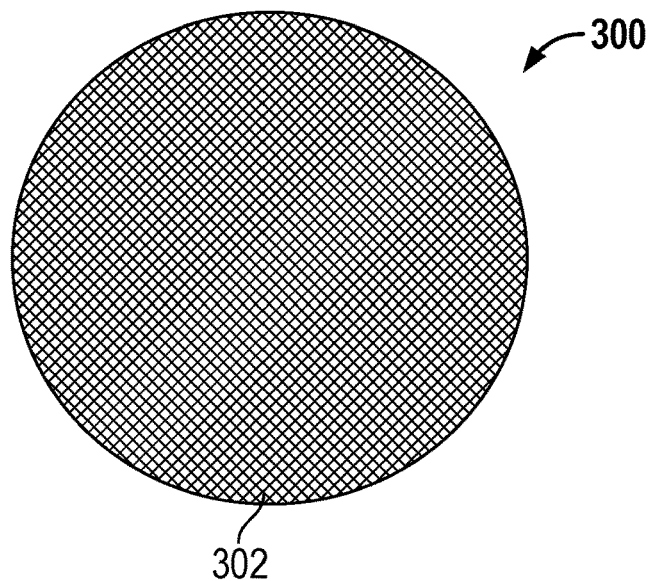
FIG. 4 illustrates a cross-sectional view of a conduit array according to an embodiment.

Turning to FIG. 3, according to an embodiment, in order to increase the sensitivity as mass flow decreases, the cross-sectional area of the flow conduits 103 is changed to multiple small conduits instead of a single large tube, as shown by conduit array 300. The conduit array 300 provides a plurality of small conduits 302. The number of active small conduits 302—conduits that allow process fluid to pass therethrough—is adjustable. As the mass flow decreases, individual small conduits 302 are blocked in order to decrease the total cross-sectional area of the conduit array 300, and thus increase fluid velocity. FIG. 3 illustrates the conduit array 300 having four small conduits 302. This is merely an example, and the number of small conduits 302 could be as small as three, and as large as many hundreds or even thousands, as illustrated in FIG. 4. The conduit array may be cylindrical as in FIG. 4, or rectangular as in FIG. 3.

Also, arrays that are square, triangular, polygonal, oval, curved, or any other shape known in the art are contemplated. Similarly, the small conduits 302 may be round, square, polygonal, and any other shape known in the art.

In embodiments with hundreds or thousands of small conduits 302, the flowmeter 5 has an extremely variable cross-sectional area range, thus allowing for extremely high turndowns.

With continuing reference to FIG. 3, this illustrates an example where the sum of the areas of the small conduits 302 of the conduit array 300 have the same flow area as the standard flow conduit 103 illustrated. Since there are only four small conduits 302, each small conduit 302 has 25% of the flow area of the standard flow conduit 103. As mass flow decreases through a prior art flowmeter having the standard flow conduit 103, there would be a point where the mass flow rate can no longer be reliably determined. In contrast, each individual small conduit 302 in embodiments of flowmeters 5 provided, is closed for an appropriate predetermined flow rate to decrease the cross-sectional area of the conduit array 300. This increases the Coriolis force and allows for a higher turndown ability.

Figure 5:
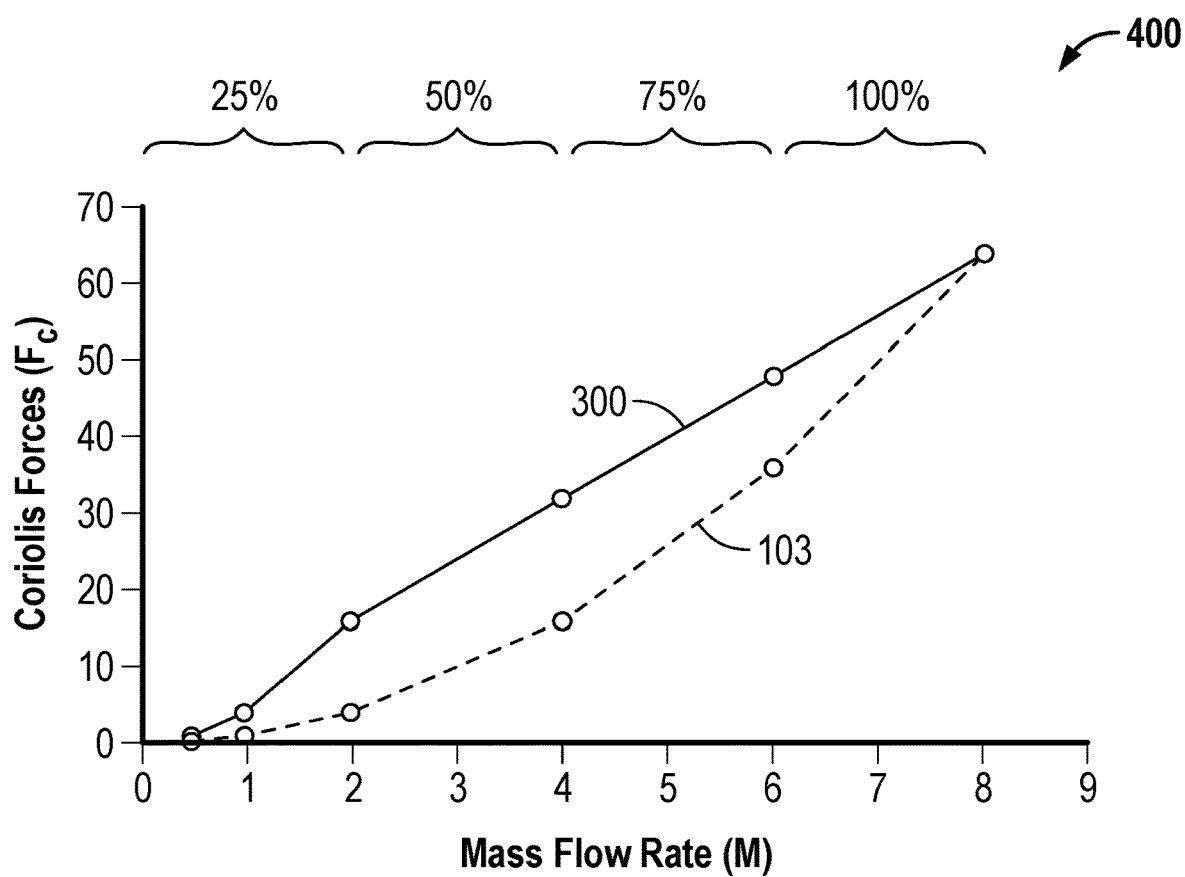
FIG. 5 is a graph comparing a prior art flow conduit to a conduit array according to an embodiment.

Again, noting that Coriolis forces change with the process fluid flow velocity squared, an example using arbitrary units highlight the improvement over the prior art by the present embodiments. This is illustrated in the graph of FIG. 5. At a high mass flow rate of 8 units, the Coriolis forces in the standard flow conduit 103 would be directly squared to equal 64 units. The same 64 units would be the result of having all four small conduits 302 open to fluid flowing therethrough, since the area of the standard flow conduit 103 is the same as the area of all four small conduits 302 combined. However, if the mass flow rate were lowered to 2 units, the Coriolis forces in the standard flow conduit 103 would only be 4 units. Since the conduit array 300 is adjustable, by allowing only one of the four small conduits 302 to be open to fluid flow, the flow velocity remains relatively high as the flow area is only 25% of the standard flow conduit 103. The percentage of flow in the conduit array 300 of the standard conduit 103 is indicated at the top of the graph 400. Thus, the Coriolis forces in this example for a conduit array 300 having only one of the small conduits 302 open, would be 16 units, which is 400% greater than what would occur in prior art flowmeters.

Another way to think about the embodiments relates to the beta ratio. The beta ratio is the ratio of the meter's effective diameter to the pipeline diameter. Prior art flowmeters typically have a beta ratio of about 0.8. This has been found to be a good compromise between accuracy, sensitivity, pressure drop, and flow rate. The beta ratio, β, may be determined as follows:

$$\beta = \frac{d}{D} \quad (5)$$

Where:
β=beta ratio;
D=diameter of inlet pipe; and
d=diameter of conduit.

The flowmeter 5, according to an embodiment, is essentially a variable beta ratio flowmeter that allows for maintaining an ideal meter diameter, further allowing the beta ratio to become lower, and providing more sensitive and accurate measurements as the flow rate and pressure drop decreases. For a given maximum flow rate, a predetermined minimum cross-sectional area of the conduits is needed for optimal flowmeter performance, which is provided by opening additional small conduits 302.

In an embodiment, as small conduits 302 are opened and closed, a flow calibration factor (FCF) is adjusted. Therefore, meter electronics 20 applies the appropriate FCF based upon the number of small conduits 302 utilized.

Figure 6:
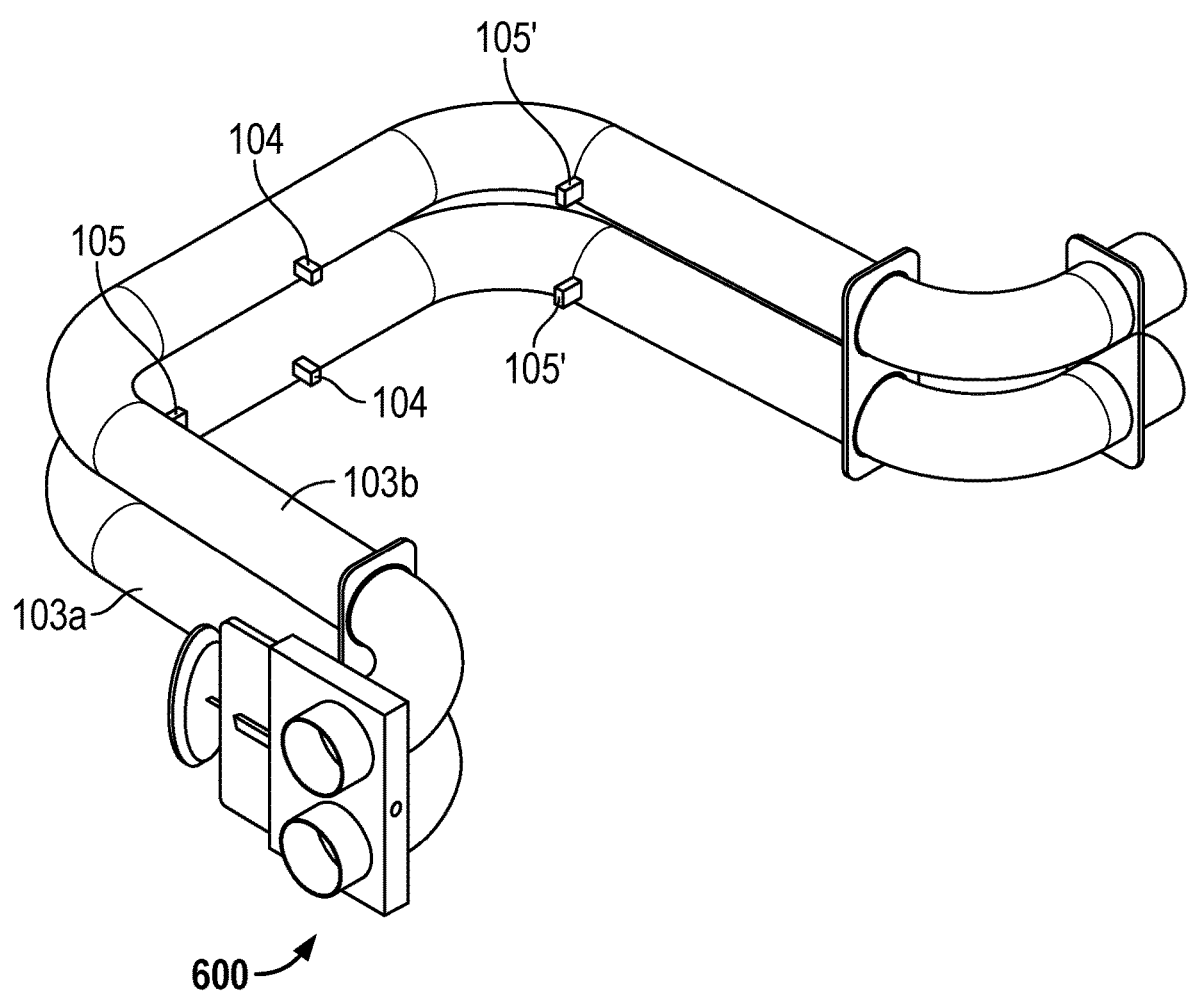
FIG. 6 shows a portion of a sensor assembly according to an embodiment.
Figure 8:
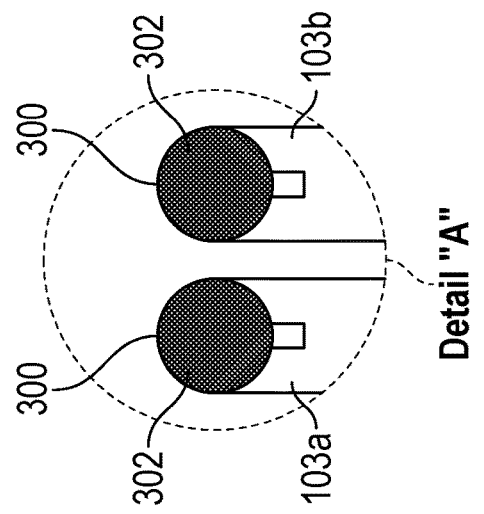
FIG. 8 shows a detail view of the cutaway view of FIG. 3.
Figure 7:
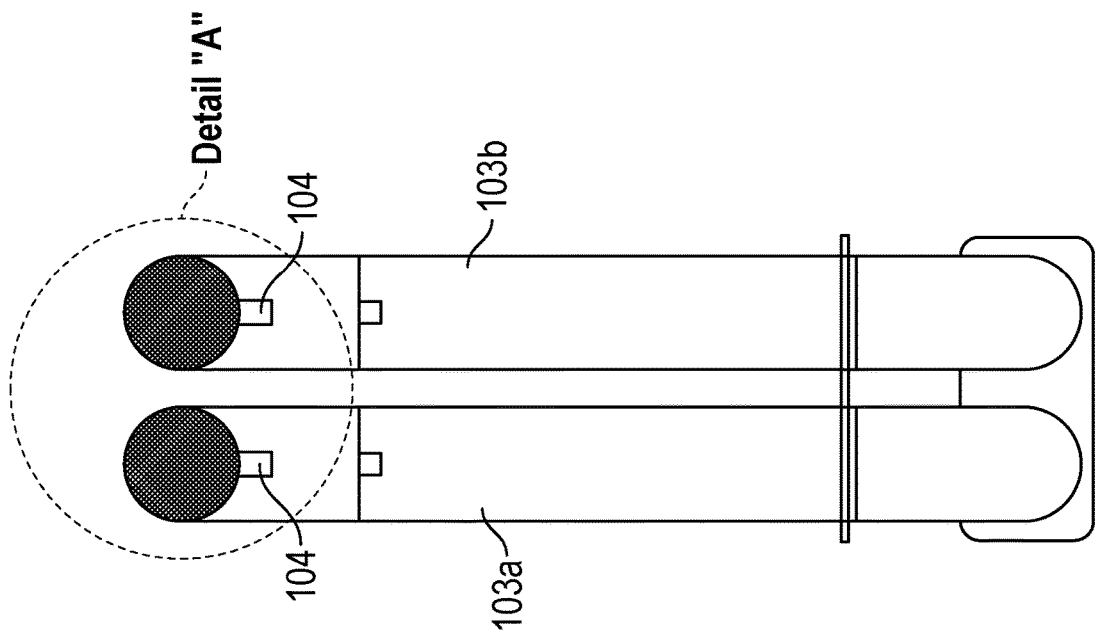
FIG. 7 shows a cutaway view of the sensor assembly of FIG. 6.

FIGS. 6-8 illustrate a portion of a sensor assembly 10 according to an embodiment. FIG. 6 illustrates a valve assembly 600. The valve assembly 600 is illustrated as a gate valve, but any type of valve that allows control of fluid through the small conduits 302 is contemplated. FIG. 7 shows a cross section of FIG. 6, and FIG. 8 shows a detailed view of the cross section of flow conduits 103A, 103B. In this embodiment, each flow conduit 103A, 103B comprises a conduit array 300 having a cross-section similar to that illustrated in FIG. 4. As the valve assembly 600 is opened, the number of small conduits 302 that have access to process fluid increases, which may accommodate greater flow rates as described above.

Figure 9:
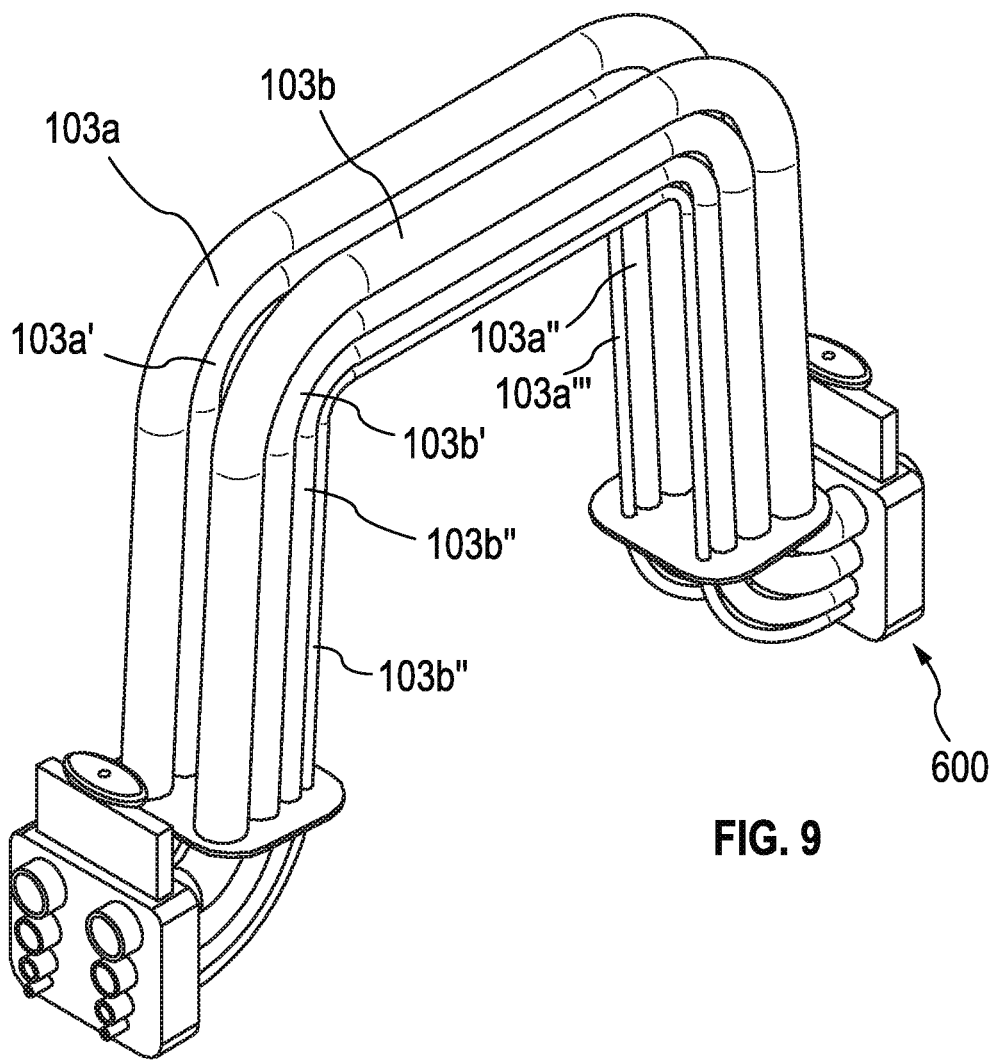
FIG. 9 shows a portion of a sensor assembly according to an embodiment.
Figure 10:
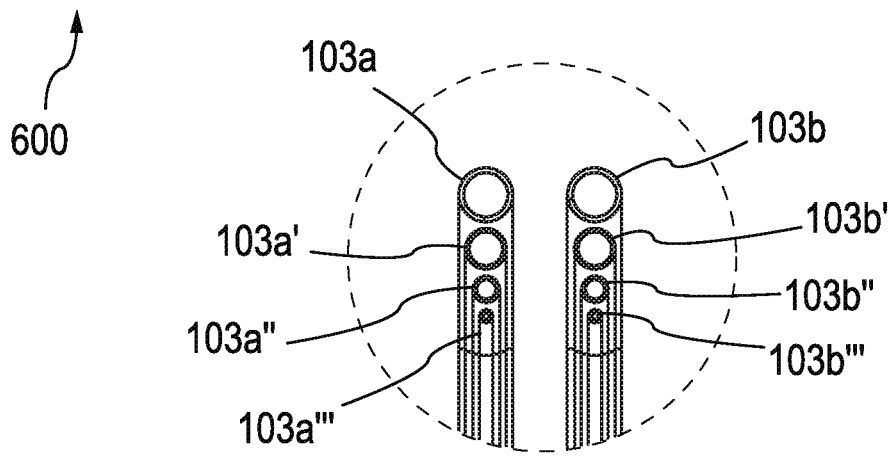
FIG. 10 shows a cross-sectional view of the conduits of the sensor assembly of FIG. 9.

FIGS. 9 and 10 illustrate a portion of a sensor assembly 10 according to an embodiment. The valve assembly 600 is illustrated as a gate valve, but any type of valve that allows control of fluid through the conduits 103a, 103b, 103a', 103b', 103a'', 103b'', 103a''', and 103b''' is contemplated. FIG. 10 shows a cross section of the conduits 103a, 103b, 103a', 103b', 103a'', 103b'', 103a''', and 103b''' of FIG. 9. In this embodiment, the plurality of flow conduits 103a, 103b, 103a', 103b', 103a'', 103b'', 103a''', and 103b''' are present. According to an embodiment, in order to increase the sensitivity as mass flow decreases, the cross-sectional area of the flow conduits 103 may be changed by selecting combinations of multiple small conduits instead of one or two large conduits. The plurality of conduits 103 illustrated in FIGS. 9 and 10 show 8 conduits of differing cross-sectional size. The number of active conduits 103 that allow fluid to pass therethrough is adjustable, and controlled by the valve assembly 600. As the mass flow decreases, individual conduits 103 may be blocked in order to decrease the total cross-sectional area of the active conduits 103, thus increasing fluid velocity. FIGS. 9 and 10 illustrate the conduit array 300 having eight conduits 103a, 103b, 103a', 103b', 103a'', 103b'', 103a''', and 103b'''. This is merely an example, and the number of conduits could be as small as three, and as large as many hundreds or even thousands, as illustrated in FIG. 4. Furthermore, the conduits may have the same cross-sectional areas, or may be different, as illustrated.

The present invention as described above provides various systems and methods related to variably modulated flow conduits. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors, that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating sensors, and not just to the embodiments described above and shown in the accompanying figures. Accordingly, the scope of the invention should be determined from the following claims.

What is claimed is:

1. A flowmeter (5) having a sensor assembly (10) connected to meter electronics (20), wherein the sensor assembly (10) comprises at least one driver (104) and at least one pickoff (105), comprising:
   a conduit array (300) comprising a plurality of small conduits (302) therein, configured to receive a process fluid therein, and configured to selectably adjust a beta ratio of the flowmeter (5).

2. The flowmeter (5) of claim 1, wherein the conduit array (300) comprises between 3 and 30 small conduits (302).

3. The flowmeter (5) of claim 1, wherein the conduit array (300) comprises between 30 and 300 small conduits (302).

4. The flowmeter (5) of claim 1, wherein the conduit array (300) comprises between 30 and 3000 small conduits (302).

5. The flowmeter (5) of claim 1, wherein the conduit array (300) is configured to adjust a total area of the small conduits (302) available for process fluid flow.

6. The flowmeter (5) of claim 1, wherein each one of the plurality of small conduits (302) is selectable to provide flow therethrough.

7. The flowmeter (5) of claim 1, comprising a valve configured to provide fluid communication to a subset of the plurality of small conduits (302) in order to receive the process fluid therein.

8. A method of forming a flowmeter comprising the steps of:
   providing a sensor assembly comprising conduits and at least one driver and at least one pickoff attached to the conduits, wherein the conduits comprise:
   a conduit array comprising a plurality of small conduits therein, configured to receive a process fluid therein, and configured to selectably adjust a beta ratio of the flowmeter.

9. The method of claim 8, wherein the conduit array comprises between 3 and 30 small conduits.

10. The method of claim 8, wherein the conduit array comprises between 30 and 300 small conduits.

11. The method of claim 8, wherein the conduit array comprises between 30 and 3000 small conduits.

12. The method of claim 8, comprising the step of adjusting a total area of the small conduits available for process fluid flow.

13. The method of claim 8, wherein each one of the plurality of small conduits is selectable to provide flow therethrough.

14. The method of claim 8, comprising the step of providing a valve configured to provide fluid communication to a subset of the plurality of small conduits in order to receive the process fluid therein.

* * * * *

UNITED STATES PATENT AND TRADEMARK OFFICE
CERTIFICATE OF CORRECTION

PATENT NO. : 10,591,336 B2  
APPLICATION NO. : 16/080883  
DATED : March 17, 2020  
INVENTOR(S) : Asher James Clinger Page 1 of 1

It is certified that error appears in the above-identified patent and that said Letters Patent is hereby corrected as shown below:

In the Specification

Column 8, Line 26, replace "and 103b" is contemplated." with --and 103b'" is contemplated.--; Line 44, replace "103a'", and 103b"." with --103a'", and 103b'".--.

Signed and Sealed this  
Thirteenth Day of October, 2020

Andrei Iancu  
*Director of the United States Patent and Trademark Office*